United States Patent
Pai et al.

(10) Patent No.: US 12,114,158 B2
(45) Date of Patent: Oct. 8, 2024

(54) SYSTEM FOR DETERMINING NETWORK MEMBERSHIP

(71) Applicant: Capital One Services, LLC, McLean, VA (US)

(72) Inventors: Aditya Pai, San Francisco, CA (US); Brice Elder, Mishawaka, IN (US); Sarah Olsen, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 401 days.

(21) Appl. No.: 17/392,748

(22) Filed: Aug. 3, 2021

(65) Prior Publication Data

US 2023/0039480 A1    Feb. 9, 2023

(51) Int. Cl.
| | |
|---|---|
| *H04W 12/63* | (2021.01) |
| *G06Q 20/32* | (2012.01) |
| *G06Q 20/40* | (2012.01) |
| *H04W 12/08* | (2021.01) |
| *H04W 12/12* | (2021.01) |
| *H04W 12/60* | (2021.01) |
| *H04W 12/61* | (2021.01) |

(52) U.S. Cl.
CPC .......... *H04W 12/08* (2013.01); *G06Q 20/322* (2013.01); *G06Q 20/40* (2013.01); *H04W 12/12* (2013.01); *H04W 12/61* (2021.01); *H04W 12/63* (2021.01); *H04W 12/66* (2021.01)

(58) Field of Classification Search
CPC ..... H04W 12/08; H04W 12/12; H04W 12/61; H04W 12/63; H04W 12/66; G06Q 20/322; G06Q 20/4016; G06Q 20/384; G06Q 20/40; G06Q 20/401; G06Q 20/4015; G06Q 20/405
See application file for complete search history.

(56) References Cited

U.S. PATENT DOCUMENTS

| | | | |
|---|---|---|---|
| RE42,663 E | 8/2011 | Lazarus et al. | |
| 9,818,117 B2 | 11/2017 | Groarke et al. | |
| 10,812,437 B1 * | 10/2020 | Liu | ............ H04L 51/226 |
| 2009/0248434 A1 | 10/2009 | Pfeffer et al. | |
| 2013/0204780 A1 | 8/2013 | Karri | |

(Continued)

FOREIGN PATENT DOCUMENTS

WO    WO-2021249489 A1 *  12/2021    ......... G06F 16/2428

*Primary Examiner* — Lester G Kincaid
*Assistant Examiner* — Dung L Lam
(74) *Attorney, Agent, or Firm* — Banner & Witcoff, Ltd.

(57) ABSTRACT

Aspects described herein may allow for determining network membership to facilitate detecting fraudulent messages. A computing device may receive, from one or more terminals at a first location, a plurality of interactive messages during a pre-determined time period. Each interactive message may comprise personally identifiable information of a user. The computing device may store a first record and a second record that indicate interactive messages were received from a group of users in temporal proximity to each other at the first location and the second location respectively. The computing device may send a request to confirm users in the subset are members of a network and update a membership list based on a reply received from the user. If further messages are received from devices outside the membership list, an alert may be sent to alert the possibility of a fraudulent message.

20 Claims, 6 Drawing Sheets

(56) References Cited

U.S. PATENT DOCUMENTS

| | | |
|---|---|---|
| 2020/0034839 A1* | 1/2020 | Soundararajan ... G06Q 20/4014 |
| 2021/0167949 A1* | 6/2021 | Weiss .................... H04L 9/0833 |
| 2021/0352075 A1* | 11/2021 | Thirumalai ............ G06Q 50/01 |

* cited by examiner

SYSTEM FOR DETERMINING NETWORK MEMBERSHIP

FIELD OF USE

Aspects of the disclosure relate generally to data processing, and hardware and software related thereto. More specifically, aspects of the disclosure may provide systems and methods for determining membership of a network to facilitate detecting fraudulent messages.

BACKGROUND

Payment devices (e.g., contactless payment devices) are becoming widely used to transfer money between users. Fraudulent messages may be received by these payment devices. For example, a fraudulent message may comprise a request to send money to someone who is not an intended recipient. Thus, systems and methods to better determining users in a network are needed to facilitate detecting fraudulent messages and improving the safety of the payment devices.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may provide a computer-implemented method for determining membership of a network in order to facilitate detecting fraudulent messages. For example, in at least one implementation, a computing device may receive, from one or more terminals at a first location, a plurality of interactive messages during a pre-determined time period, wherein each interactive message comprises personally identifiable information of a user. The computing device may determine, based on the plurality of interactive messages, a plurality of users associated with the plurality of interactive messages. A first record may be stored. The first record may indicate interactive messages were received from the plurality of users in temporal proximity to each other at the first location. The computing device may determine a second record that indicates interactive messages were received from a subset of the plurality of users in temporal proximity to each other at a second location. The first location and the second location may be the same location, or may be different locations. Based on the first record and the second record, a request may be sent by the computing device and to at least one user in the subset. The request may be used to confirm users in the subset are members of a network. A reply to the request may be received. The reply may confirm that the users in the subset are members of the network.

In some instances, a location list may be stored. The location list comprises a plurality of locations. The location list may comprise the first location but not the second location. The computing device may weigh the first record lower than the second record. The sending the request to confirm users in the subset are members of a network is further based on the weighing. The location list may be determined based on a number of interactive messages, that were received at each location of the plurality of locations during a second predetermined time period, reaching a threshold.

In some instances, the first record may comprise a plurality of user groups, wherein each user group consists of two users of the plurality of users. The first record may also comprise an indication, for each of the plurality of user groups, that indicates interactive messages were received from the two users in the user group in close temporal proximity to each other at the first location.

In some instances, the computing device may maintain a membership list and may add the subset to the membership list. If the computing device receives a request to authenticate an interaction between a first user and a second user, a determination may be made, based on the list, as to whether that both the first user and the second user are members of the network. If it is determined that both the first user and the second user are members of the network, the request may be approved based on the determination. If it is determined that the first user is a member of the network and the second user is not one of the members of the network, the computing device may send, to the first user and based on the determining, an alert.

In some instances, if the computing device receives, from a mobile device associated with a member of the network, a request of a content item, the computing device may send, to one or more of the other members of the network, the content item.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer-readable media for determining network membership.

Figure 1:
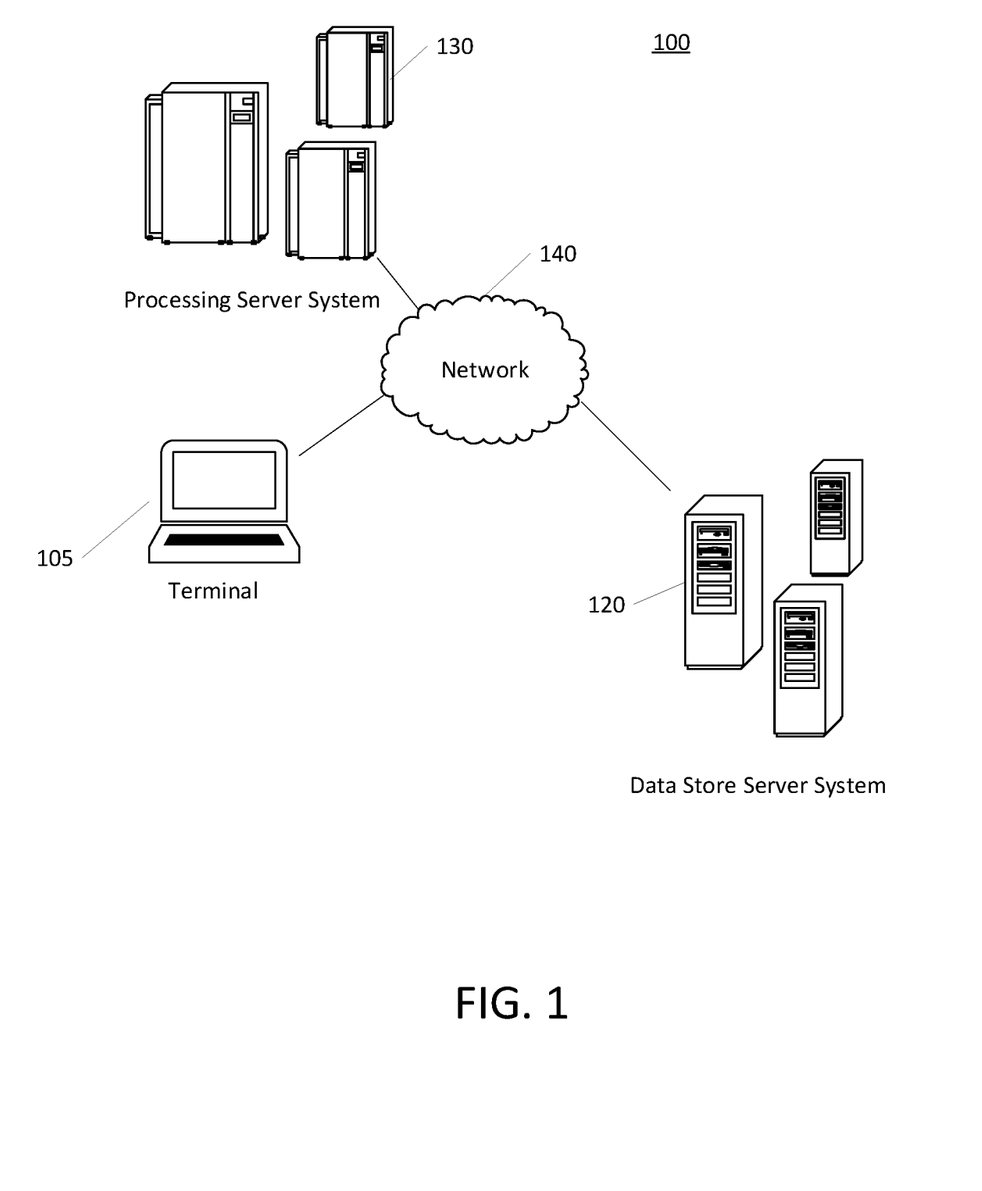
FIG. 1 depicts an example of an operating environment in which one or more aspects described herein may be implemented.

FIG. 1 shows an operating environment 100. The operating environment 100 may include at least one terminal 105, at least one processing server system 130, and/or at least one data store server system 120 in communication via a network 140. It will be appreciated that the network connections shown are illustrative and any means of establishing a communications link between the computers may be used. The existence of any of various network protocols such as Transmission Control Protocol/Internet Protocol (TCP/IP), Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Terminals 105 may receive interactive messages as described herein. Data store server systems 120 may store a variety of data, such as network membership profiles and/or location profiles that comprise information as described herein. Processing server systems 130 may exchange data with terminals 105, determine members of a network, and/or use the network membership information to facilitate future interactions (e.g., transactions) between uses as described herein. However, it should be noted that any computing device in the operating environment 100 may perform any of the processes and/or store any data as described herein. The processing server systems 130 and/or data store server systems 120 may be publicly accessible and/or have restricted access. Access to a particular server system may be limited to particular terminals 105. Some or all of the data described herein may be stored using one or more data stores. Data stores may include, but are not limited to relational databases, hierarchical databases, distributed databases, in-memory databases, flat file databases, Extensible Markup Language (XML) databases, structured Query Language (SQL) databases, graph databases, and/or a combination thereof. Any file system may be used to store data using a database and/or flat file as appropriate. The network 140 may include a local area network (LAN), a wide area network (WAN), a wireless telecommunications network, and/or any other communication network or combination thereof.

The data transferred to and from various computing devices in operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WebSocket Security (WS-S) standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

Figure 2:
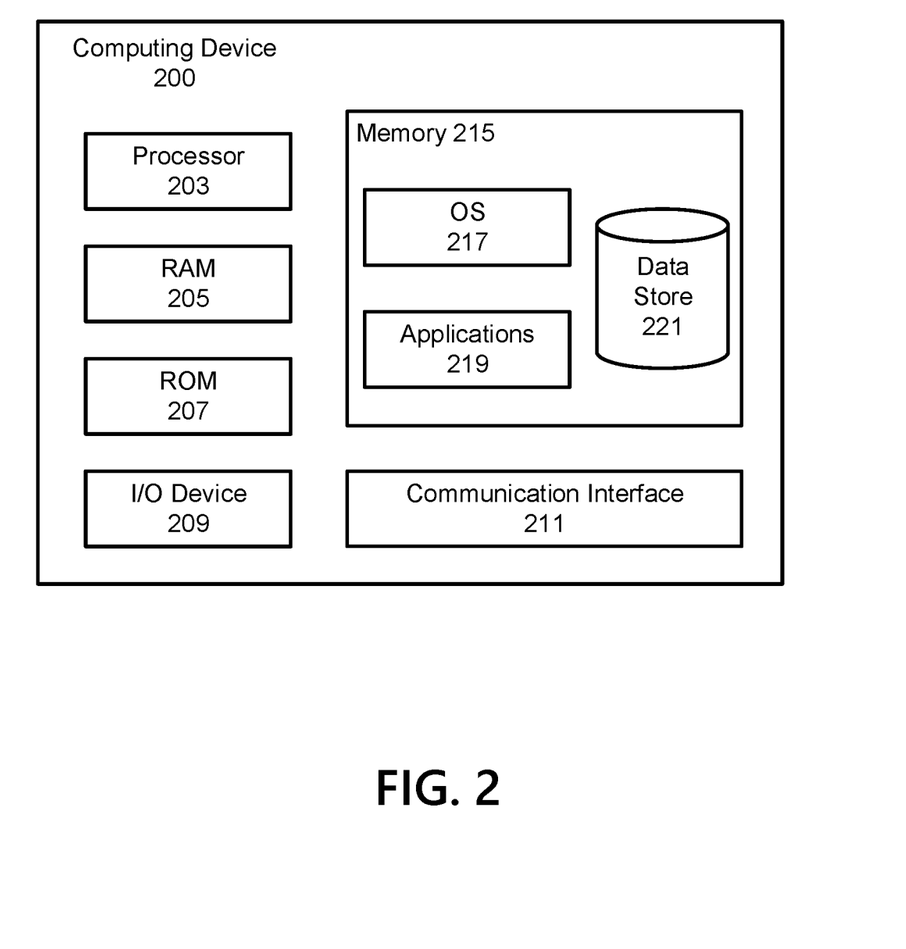
FIG. 2 depicts an example computing device in accordance with one or more aspects described herein.

Turning now to FIG. 2, a conceptual illustration of a computing device 200 that can be used to perform any of the techniques as described herein is shown. The computing device 200 can include a processor 203 for controlling an overall operation of the computing device 200 and its associated components, including RAM 205, ROM 207, input/output device 209, communication interface 211, and/or memory 215. A data bus can interconnect processor(s) 203, RAM 205, ROM 207, memory 215, I/O device 209, and/or communication interface 211. In some embodiments, computing device 200 can represent, be incorporated in, and/or include various devices such as a desktop computer, a computer server, a mobile device, such as a laptop computer, a tablet computer, a smartphone, any other types of mobile computing devices, and the like, and/or any other type of data processing device.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. Software can be stored within memory 215 to provide instructions to processor 203 allowing computing device 200 to perform various actions. Memory 215 can store software used by the computing device 200, such as an operating system 217, application programs 219, and/or one or more data stores 221. The various hardware memory units in memory 215 can include volatile and nonvolatile, removable and non-removable media implemented in any method or technology for storage of information such as computer-readable instructions, data structures, program modules, or other data. Memory 215 can include one or more physical persistent memory devices and/or one or more non-persistent memory devices. Memory 215 can include, but is not limited to, random access memory (RAM) 205, read-only memory (ROM) 207, electronically erasable programmable read-only memory (EEPROM), flash memory or other memory technology, optical disk storage, magnetic cassettes, magnetic tape, magnetic disk storage or other magnetic storage devices, or any other medium that can be used to store the desired information and that can be accessed by processor 203.

Communication interface 211 can include one or more transceivers, digital signal processors, and/or additional circuitry and software for communicating via any network, wired or wireless, using any protocol as described herein. It will be appreciated that the network connections shown are illustrative and any means of establishing a communications link between the computers can be used. The existence of any of various network protocols such as TCP/IP, Ethernet, FTP, Hypertext Transfer Protocol (HTTP) and the like, and various wireless communication technologies such as Global system for Mobile Communication (GSM), Code-division multiple access (CDMA), WiFi, and Long-Term Evolution (LTE), is presumed, and the various computing devices described herein can be configured to communicate using any of these network protocols or technologies.

Processor 203 can include a single central processing unit (CPU) (and/or graphic processing unit (GPU)), which can include a single-core or multi-core processor along with multiple processors. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches including, but not limited to, CPU caches used by the processor 203, page caches used by the operating system 217, disk caches of a hard drive, and/or database caches used to cache content from data store 221. For embodiments including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a data store 221 is cached in a separate smaller database in a memory separate from the data store, such as in RAM 205 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of devices, systems, and methods described herein, such as faster response times and less dependence on network conditions when transmitting and receiving data.

Any data described and/or transmitted herein can include secure and sensitive data, such as confidential documents, customer personally identifiable information, and account data. Therefore, it can be desirable to protect transmissions of such data using secure network protocols and encryption, and/or to protect the integrity of the data when stored on the various computing devices. For example, a file-based integration scheme or a service-based integration scheme can be utilized for transmitting data between the various computing devices. Data can be transmitted using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In many embodiments, one or more web services can be implemented within the various computing devices. Web services can be accessed by authorized external devices and users to support input, extraction, and manipulation of data between the various computing devices 200. Web services built to support a personalized display system can be cross-domain and/or cross-platform, and can be built for enterprise use. Data can be transmitted using the Secure Sockets Layer (SSL) or Transport Layer Security (TLS) protocol to provide secure connections between the computing devices. Web services can be implemented using the WS-Security standard, providing for secure SOAP messages using XML encryption. Specialized hardware can be used to provide secure web services. For example, secure network appliances can include built-in features such as hardware-accelerated SSL and Hypertext Transfer Protocol Secure (HTTPS), WS-S, and/or firewalls. Such specialized hardware can be installed and configured in the computing device 200 in front of one or more computing devices such that any external devices can communicate directly with the specialized hardware.

Although various components of computing device 200 are described separately, functionality of the various components can be combined and/or performed by a single component and/or multiple computing devices in communication without departing from the invention.

Figure 3:
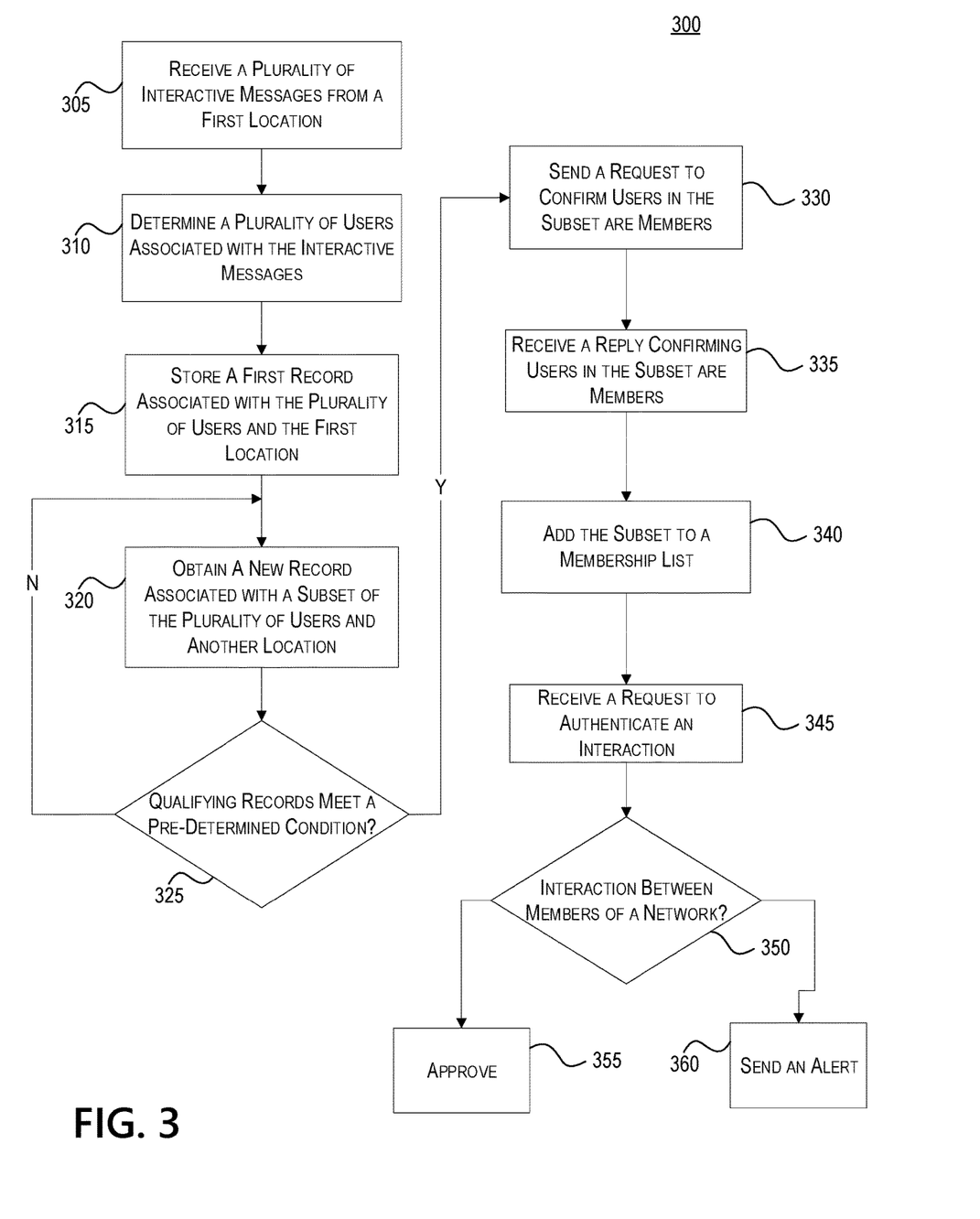
FIG. 3 depicts a flow diagram of an example method for determining network membership in accordance with one or more illustrative aspects discussed herein.

FIG. 3 depicts a flow diagram of an example method 300 for determining network membership. Some or all of the steps of method 300 may be performed using a system that comprises one or more computing devices as described herein, including, for example, computing device 200, or computing devices in FIG. 1.

At step 305, the system may receive a plurality of interactive messages during a pre-determined time period, wherein each interactive message comprises personally identifiable information of a user.

The plurality of interactive messages may be sent from one or more terminals 105 at a first location. For example, an interactive message may be sent from a terminal 105 to the processing server system 130 in FIG. 1. For example, an interactive message may be a request sent from a user to a bank where the user owns a bank account, and the request may be to request a money transfer from the user's bank account to a merchant (e.g., a sandwich store).

The personally identifiable information may be information that can be used to identify the user. For example, the personally identifiable information of the user may comprise the user's name, account number, or user identifier associated with the user's account. Other personally identifiable information is also possible.

A terminal 105 may be a computing device used by the user to send the interactive messages. A terminal 105 may be a personal device (e.g., a smartphone, a laptop, a tablet, etc.) of the user, and the interactive messages may be sent from an application (e.g., an application associated with the user's bank account) on the personal device. A terminal 105 may also be a computing device owned by the merchant at the first location. For example, a terminal 105 may be a Point of Sale (POS) device, a Point of Purchase (POP) device, or any other device that is configured to process payment requests. The plurality of interactive messages may be sent from one terminal 105, or may be sent from a plurality of terminals 105. The plurality of terminals 105 may be the same type of computing device, or may be different types of computing devices.

A location may be a physical geographical area associated with a merchant. For example, the first location may be a physical geographical area occupied or near a sandwich store. The location may be determined based on the global positioning system (GPS) information of the terminals 105.

A location may also be a virtual location associated with the merchant. For example, if the interactive message is a request to transfer money to a merchant at a location, the interactive message may be deemed to be sent at the location, even if the user may use a computing device to request the transfer remotely. For example, the user may, at the user's home, make an online payment request to a sandwich store, and then go to pick up the sandwich later on. The payment request made at the user's home may still be deemed as an interactive message received from a terminal 105 at the sandwich store.

Interactive messages received during the pre-determined time period, as may be discussed below, may be deemed to be received within temporal proximity. As may be described below, the system may infer users who send the interactive messages at the first location during the pre-determined time period may be members of a network (e.g., a social network where members know each other). Consistent with the example described above, where the first location is a sandwich store, if two users send the request respectively to pay for their own sandwich within the pre-determined time period (e.g., five minutes), it may indicate that the two users are friends and may have come to the sandwich store together.

The pre-determined time period may be determined by a network administrator or by the system based on a pre-configured rule. The pre-determined time period may be determined based on the average time to process interactive messages at the location. For example, at a sandwich store where sandwiches have been packed when the user arrives at the checkout counter, the payment may be processed relatively fast (e.g., an average of one minute is needed to process the payment of a user). Then, a pre-determined time may be configured as, for example, three minutes. That may indicate that users who pay within three minutes are likely to have come to the sandwich store together. By contrast, for example, at a wholesale supermarket, the payment may be proceeded relatively slow (e.g., an average of five minutes is needed to process the payment of a user) because the checkout process comprises scanning all the items each user purchases, putting them into a cart, and then calculating the price. Then, a pre-determined time may be configured as, for example, ten minutes. That may indicate that users who pay within ten minutes are likely to have come to the wholesale supermarket together.

At step 310, the system may determine, based on the plurality of interactive messages, a plurality of users associated with the plurality of interactive messages. The determination may be based on the personally identifiable information comprised in the interactive messages.

At step 315, the system may store a first record associated with the plurality of users and the first location. The first record may indicate interactive messages were received from the plurality of users in temporal proximity to each other at the first location. The first record may comprise one or more data items. The plurality of users may be divided into a plurality of user groups, and each user group may comprise a subset of the plurality of users. Each of the one or more data items may comprise an indication that indicates interactive messages were received from a subset of the plurality of users in temporal proximity to each other at the first location.

Figure 5A:
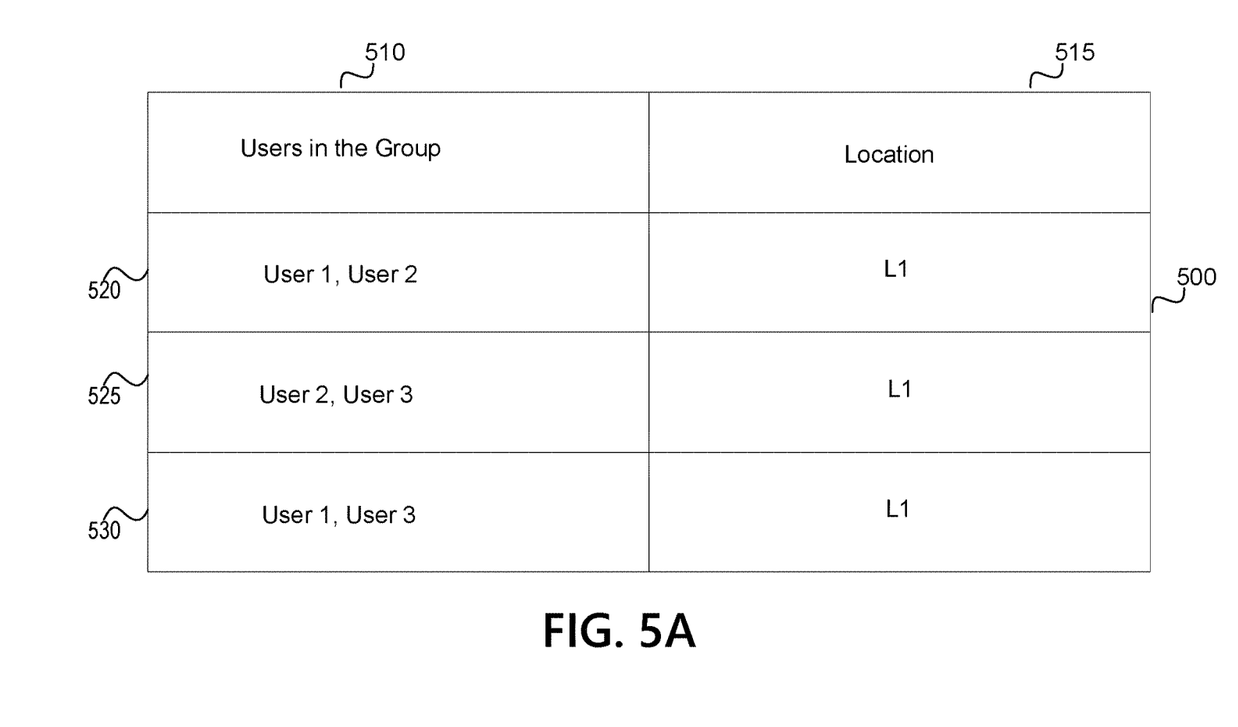
FIG. 5A and FIG. 5B depict exemplary information in accordance with one or more illustrative aspects discussed herein.

FIG. 5A depicts an example of the first record 500. In the example shown in FIG. 5A, the first record 500 may comprise three pieces of data items, e.g., data item 520, 525, and 530, but any number of data items may be used. For example, each data item may comprise two pieces of information, "Users in the Group" information 510 and "Location" information 515. Other relevant information may also be comprised. For example, the time period during which the interactive messages were received or the weight of each record (such as may be depicted in FIG. 6 below) may also be comprised.

In the depicted example shown in FIG. 5A, the plurality of users may comprise user 1, user 2, and user 3. Therefore, the first record 500 may indicate that interactive messages from user 1, user 2, and user 3 were received at one or more terminals 105 at the location L1 in temporal proximity to each other. For example, these three users made payment at a sandwich store during a pre-determined time period, e.g., 10 AM-10:15 AM on Mar. 11, 2021. The plurality of users may be divided into three user groups. In the depicted example shown in FIG. 5A, each group consists of two users, but groups may consist of any number of users. Each data item may indicate information regarding a group. For example, data item 520 may indicate interactive messages were received from user 1 and user 2 in temporal proximity at location L1. Data item 525 may indicate interactive messages were received from user 2 and user 3 in temporal proximity at location L1. Data item 530 may indicate interactive messages were received from user 3 and user 1 in temporal proximity at location L1. The first record 500 may be stored in data store server system 120 as depicted in FIG. 1.

Turning back to FIG. 3, at step 320, the system may obtain a new record associated with a subset of the plurality of users. The new record may indicate interactive messages were received from the subset in temporal proximity to each other at another location. The new record may be structured in a similar way as the first record 500 as depicted above. The new record may be obtained in a similar way as depicted in steps 305-315.

Figure 5B:
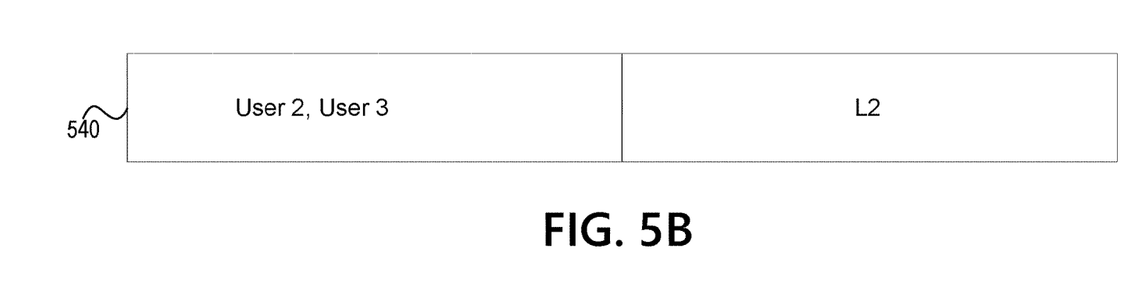

For example, as may be shown in FIG. 5B, the system may store a second record associated with a subset of the plurality of users. The second record may comprise a data item that indicates interactive messages were received from the subset in temporal proximity at a second location. For example, consistent with the example depicted in FIG. 5A, user 2 and user 3 may be a subset of the plurality of users of user 1, user 2, and user 3 in the first record 500. The second record may comprise data item 540. Data item 540 may indicate that interactive messages were received from user 2 and user 3 in temporal proximity at the location L2. For example, the second location may be a ticket station of a national park. The second record may be generated based on the determination that user 2 and user 3 made payment at the ticket station during another pre-determined time period (e.g., 2:00 PM-2:20 PM on Mar. 12, 2021). The second record may comprise other data items (as may also be shown in FIG. 5B) that may also indicate that interactive messages were received from other users, for example, user 4 and user 5, during that time period. Location L1 and location L2 may be the same location, or may be different locations.

Turning back to FIG. 3, at step 325, the system may determine whether qualifying records associated with a subset meet a pre-determined condition. Each of the qualifying records may indicate interactive messages were received from the subset in temporal proximity at a certain location. For example, the first record 500 and the second record depicted in FIGS. 5A-5B may be qualifying records associated with the subset of user 2 and user 3. If the system determines the pre-determined condition is met, the method may proceed to step 330 regarding the subset. Otherwise, the method may return to step 320 to obtain more records associated with the subset.

The system may determine the pre-determined condition is met based on the number of qualifying records reaches the threshold. For example, the threshold may be two. Consistent with the example depicted in FIGS. 5A-5B, there may be multiple qualifying records that indicate interactive messages were received from user 2 and user 3 in temporal proximity to each other at a certain location (e.g., at location L1 on Mar. 11, 2021, and at location L2 on Mar. 12, 2021). By contrast, there may be only one record that indicates interactive messages were received from user 1 and user 2 in temporal proximity to each other at a certain location (e.g., at location L1 on Mar. 11, 2021). The system may determine that the number of qualifying records associated with the subset consisting of user 2 and user 3 reaches the threshold and the method may proceed to step 330 regarding user 2 and user 3. The system may determine that the number of qualifying records associated with the subset consisting of user 1 and user 2 does not reach the threshold and the method may return to step 320 regarding user 1 and user 2. Qualifying records may be subject to certain limitations. For example, a limitation may require the interactive messages received in all the qualifying records be received within a certain time range (e.g., a week). In that example, if a third record that indicates interactive messages were received from user 1 and user 2 in temporal proximity to each other at location L3 on another date that is more than a week ago from Mar. 11, 2021, then the third record may not be counted as a qualifying record. In addition to or instead of determining whether the number of qualifying records reaches the threshold, the system may determine the pre-determined condition is met based on other approaches, such as may be depicted below in FIG. 4.

At step 330, the system may send a request, to at least one user in the subset, to confirm users in the subset are members of a network. The network may be a social network of the at least one user. The network may only comprise the subset, or may comprise other members outside the subset. For example, consistent with the example depicted in FIGS. 5A-5B, a request may be sent to user 2 to confirm whether user 3 is a member of user 2's social network, which may comprise other members in user 2's social network (e.g., user 2's other friends). Or, a request may be sent to both user 2 and user 3 to confirm that they are within a network consisting of user 2 and user 3.

At step 335, the system may receive a reply that confirms users in the subset are members of the network. Consisting with the example depicted in FIGS. 5A-5B, a request may be received from a device of user 2 that confirms user 3 is a member of user 2's network.

Alternative to step 330 and 335, the system may directly determine that users in the subset are members of a network without sending requests to any user to confirm.

At step 340, the system may, based on the reply received at step 335, add the subset to a membership list of the network. A membership list may have been stored and maintained in the system. Based on the reply, users who are in the subset but have not been added to the membership list may be added. For example, consistent with the example depicted in FIGS. 5A-5B, user 3 may be added to a membership list of user 2's network.

The membership list may be used in a variety of ways. For example, as may be depicted at steps 345 to 360 below, the membership list may be used to authenticate an interaction between two users. For another example, the membership list may be used to send the same content item to some members because members of the same network (e.g., social network) may share similar interests. The system may receive, from a mobile device associated with a member of the network, a request for a content item. For example, the content item may be an advertisement, or a webpage of an online shopping website to purchase a product. The system may send, to one or more of the other members of the network, the content item.

At step 345, the system may receive a request to authenticate an interaction between a first user and a second user. For example, the interaction may be money transferring from the first user to the second user. For example, the first user may send, to a bank where the first user owns a bank account, a request to transfer money to the second user. If the request is authenticated, the bank may transfer the money from the first user's bank account to the second user's bank account.

At step 350, the system may determine whether the interaction is between members of a network. If the system determines both the first user and the second user are members of the network, the method may proceed to step 355. If the system determines that the second user is not a member of the network, the method may proceed to step 360.

The network may be a network of the user who initiates the interaction. If the interaction is a money transfer, the sender may be deemed as the user who initiates the interaction. For example, if the interaction is a money transfer from the first user to the second user, the system may determine whether the membership list of the network of the first user comprises the second user.

At step 355, the system may approve the interaction based on the determination that both the first user and the second user are members of a network.

At step 360, the system may send, to the first user and based on the determination that the second user is not a member of the first user's network, an alert. For example, if the interaction is a money transferring, the system may send, to the first user, an alert that alerts the first user to double-check whether the second user is the intended recipient of the money, because the second user is not a member of the first user's network.

One or more steps of the example, the method may be rearranged, omitted, and/or otherwise modified, and/or other steps may be added. For example, a method may begin at step 345 for an interaction using a pre-determined membership list.

Figure 4:
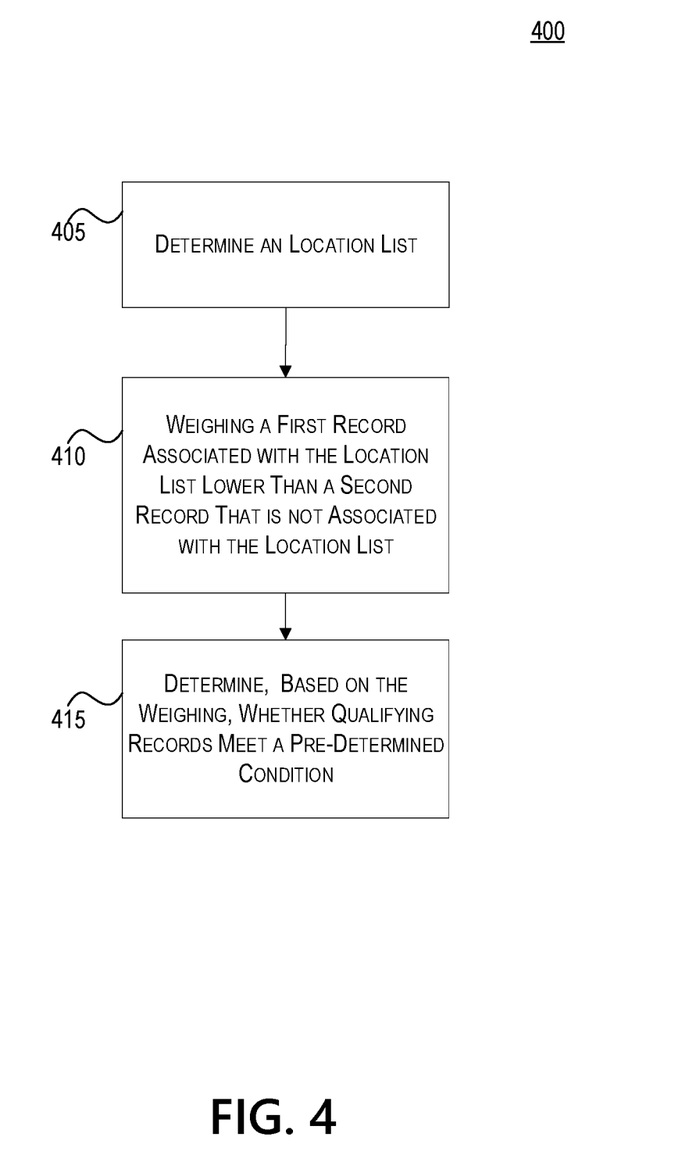
FIG. 4 depicts a flow diagram of an example method for determining network membership in accordance with one or more illustrative aspects discussed herein.

FIG. 4 depicts a flow diagram of an example method for determining network membership. Some or all of the steps of method 400 may be performed using a system that comprises one or more computing devices as described herein, including, for example, computing device 200 in FIG. 2, or computing devices in FIG. 1. The method 400 may be used in FIG. 3, for example, in step 325, to determine whether qualifying records associated with a subset of the plurality of users in FIG. 3 meet a pre-determined condition.

At step 405, the system may determine a location list. A location list may comprise a plurality of locations. The interactive messages may be interactive messages depicted in FIG. 3. The plurality of locations may be locations depicted in FIG. 3. The location list may comprise a list of location identifications. The location list may indicate that interactive messages received at a location within the location list may be less relevant in determining whether the plurality of users are members of a network or not, compared with interactive messages received at a location outside the location list.

Consistent with the example depicted in FIG. 3 above, the interactive messages may be a request sent from a user to a bank where the user owns a bank account, and the request may be to request a money transfer from the user's bank account to a merchant at a location.

At some locations (e.g., a crowded sandwich store that has a lot of visitors), users who are not within a network (e.g., users who are strangers that are not within the same social network) may nevertheless make payment in temporal proximity to each other. For example, people may wait in a line and make payment consecutively during lunchtime at the crowded sandwich store, and therefore those who are next to each other in the line may likely be strangers. In other locations, people who pay in temporal proximity to each other may be more likely to be within a network. For example, at a ticket station of a national park, people who pay in temporal proximity to each other may be more likely to have known each other and have come to the national park together. Therefore, the payment requests received at the national park may be more relevant than the payment requests received at the crowded sandwich store in determining whether users who pay in temporal proximity are members of a social network. In this example, the system may include the sandwich store in the location list, but do not include the national park in the location list.

The system may include certain locations in the location list during a certain time period, but not include those certain locations outside the certain time period. In the example of the sandwich store, while people who pay in temporal proximity during lunchtime may be less likely to know each other, people who pay in temporal proximity during midnight may be more likely to know each other. This may be because there may not be too many people who generally go to the sandwich store during midnight. If two people happened to go to the sandwich store and make payment in temporal proximity during the midnight, it may be more likely that they came together. Therefore, the location list may include the sandwich store during lunchtime, but not include the sandwich store during midnight.

The determination of which location may be more relevant in determining whether a group of users are members of a network may be made based on multiple ways, as may be described below.

In some examples, the determination as to whether a location should be included in the location list may be based on the number of interactive messages that were received at the location during a second predetermined time period. If the number of interactive messages reaches a threshold, the location may be comprised in the location list. For example, the second pre-determined time may be 20 minutes. Consistent with the example described above regarding the comparison between the crowded sandwich store and the national park, there may be 15 payment requests received at the sandwich store during the second pre-determined time, while there may be 2 payment requests received at the national park during the second predetermined time. If the threshold is, for example, 9, then the system may determine that the number of interactive messages that were received at the sandwich store reaches the threshold, and therefore include the sandwich store into the location list. The system may also determine that the number of interactive messages that were received at the national part does not reach the threshold, and therefore does not include the national park into the location list.

In other examples, the determination may be based on whether interactive messages are received at relatively consistent time intervals. For example, in the crowded sandwich store where people pay consecutively in a line, the time interval may be relatively consistent. For example, the time interval between two payments are received at the checkout counter at the sandwich store may vary between one to three minutes. By contrast, at the ticket station of the national park where visitors are usually sparse, the time intervals between two payments are received may be relatively inconsistent. For example, if five friends go to the national park together, the ticket station of the national park may receive five payments, the time interval between each of these five payments may be 1-2 minutes. And then, in the next half hour, there may be no visitors, and a new visitor may arrive 30 minutes later. Therefore, the time interval between the last payment made by one of the five friends and the payment made by the new visitor may be 30 minutes. The crowded sandwich store may be added to the location list based on the determination that the time intervals between payments are received are relatively consistent. The system may determine the consistency based on the Variance of the time intervals between each two consecutive interactive messages are received. If the Variance at a location is less than a threshold, the location may be comprised in the location list.

In other examples, the determination may be based on surveys or machine learning models that may indicate the correlation between the fact that interactive messages were received from users at temporal proximity and the likelihood that these users are members of the network.

At step 410, the system may weigh a first record that is associated with the location list lower than a second record that is not associated with the location list. The first record may indicate that interactive messages were received from a group of users in temporal proximity to each other at a first location. The location list may comprise an indication of the first location. The second record may indicate that interactive messages were received from the group of users in temporal proximity to each other at a second location. The location list may not comprise an indication of the second location.

The group of users may be the subset described in FIG. 3. The first record may be the first record described in FIG. 3. The second record may be the second record described in FIG. 3.

Figure 6:
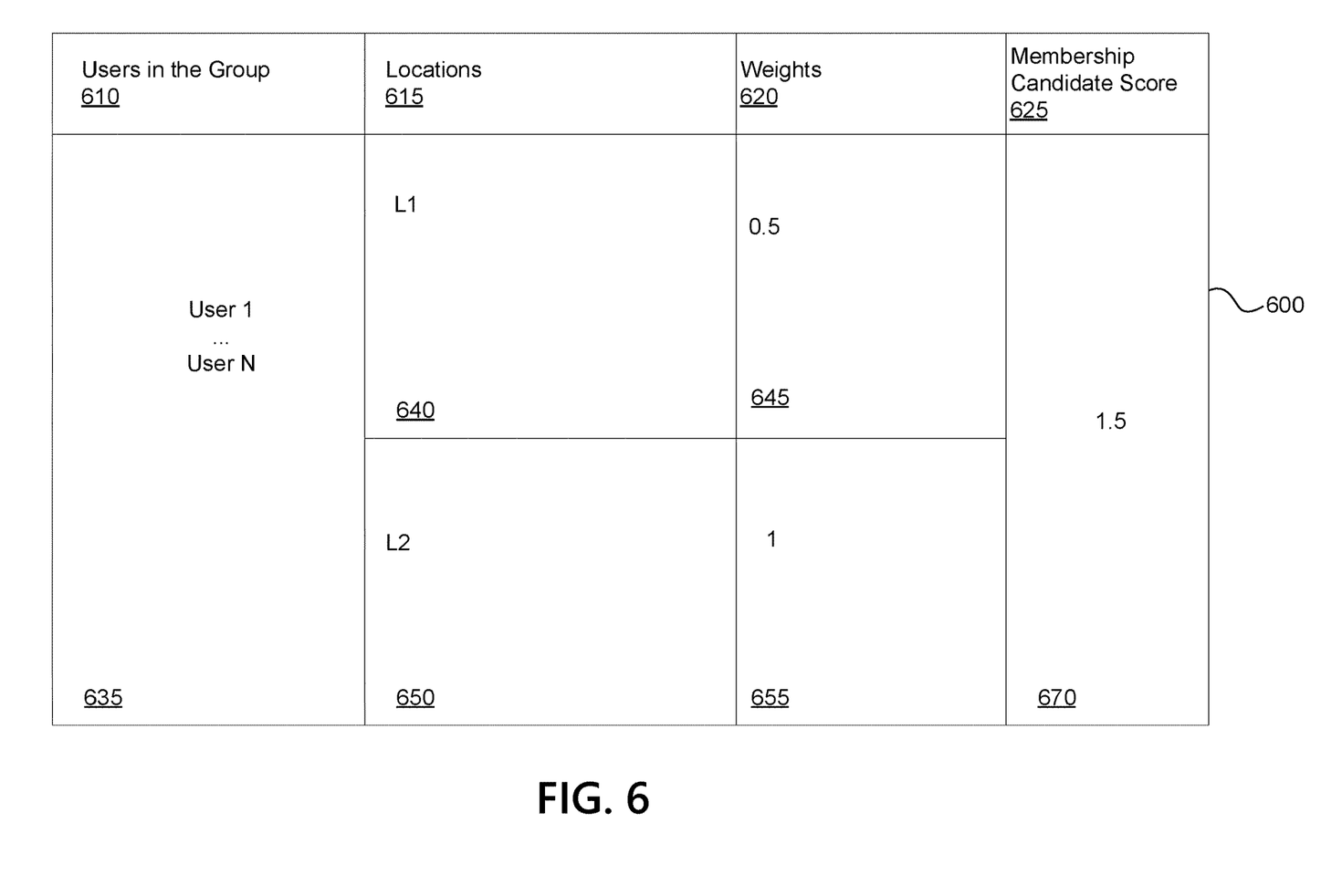
FIG. 6 depicts an example of data set in accordance with one or more illustrative aspects discussed herein.

FIG. 6 shows an example data set 600 that comprises a plurality of records associated with a group of users. As may be shown in table cell 635, the group of users may comprise two or more users (e.g., user 1, user 2 . . . and user N). The example shown in FIG. 6 may comprise two records (e.g., a first record shown in table cell 640, a second record shown in table cell 650), but any numbers of records are possible. The first record may indicate that interactive messages were received from the group of users in temporal proximity to each other at location L1. For example, consistent with the example at step 405, L1 may be the crowded sandwich store. The sandwich store may be associated with the location list. The second record may indicate that interactive messages were received from the group of users in temporal proximity to each other at location L2. For example, consistent with the example at step 405, L2 may be the ticket station of the national park that is not associated with the location list. The first record may be assigned a lower weight than the second record. For example, as may be shown in FIG. 6, table cell 645 may indicate that the first record may be assigned a weight of 0.5, while the table cell 650 may indicate that the second record may be assigned a weight of 1. The weight assigned are examples and other weights (including a weight of 0) are also possible. For example, weighing the first record and the second record may comprise adding the respective weights together to get a membership candidate score. As is shown in table cell 670, the membership candidate score obtained by weighing the first record and the second record may be 1+0.5=1.5.

The system may store a plurality of location lists and each location list may comprise one or more locations. A weight may be assigned to a record based on the location list the record is associated with.

Referring back to FIG. 4, at step 415, the system may determine whether qualifying records associated with a group of uses meet a pre-determined condition based on the weighing at step 410. The system may determine whether the result of weighing (e.g., the membership candidate score depicted in FIG. 6) reaches a threshold. For example, consistent with the example in FIG. 6, if the threshold is 3, since the membership candidate score is 1.5, the system may determine that qualifying records do not meet the pre-determined condition. The system may wait to obtain more records associated with the group of users and then perform steps 410 and 415 again.

One or more steps of the example, the method may be rearranged, omitted, and/or otherwise modified, and/or other steps may be added.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, by a computing device and from one or more terminals at a first location, a plurality of interactive messages during a pre-determined time period, wherein each interactive message comprises personally identifiable information of a user;
determining, by the computing device and based on the plurality of interactive messages, a plurality of users associated with the plurality of interactive messages;
storing, by the computing device, a first record that indicates interactive messages were received from the plurality of users in temporal proximity to each other at the first location;
determining, by the computing device, a second record that indicates interactive messages were received from a subset of the plurality of users in temporal proximity to each other at a second location;
assigning, to each of the first record and the second record, a respective weight;
sending, by the computing device, to at least one user in the subset, and based on the weight assigned to the first record being lower than the weight assigned to the second record, a request to confirm users in the subset are members of a network;
receiving a reply to the request, wherein the reply confirms that the users in the subset are members of the network;
adding, by the computing device and to a membership list, the subset;
receiving a second request to authenticate an interaction between a first user and a second user;
determining, by the computing device and based on the membership list, that both the first user and the second user are members of the network; and
approving, based on the determining that both the first user and the second user are members of the network, the second request.

2. The method of claim 1, further comprising:
storing a location list that comprises a plurality of locations, wherein the location list comprises the first location but not the second location, and
wherein the assigning the respective weight is based on the location list.

3. The method of claim 2, further comprising:
determining, based on a number of interactive messages, that were received at each location of the plurality of locations during a second predetermined time period, reaching a threshold, the location list.

4. The method of claim 1, wherein the first location and the second location are the same location.

5. The method of claim 1, wherein the first record comprises:
a plurality of user groups, wherein each user group comprises two users of the plurality of users; and
an indication, for each of the plurality of user groups, that indicates interactive messages were received from the two users in the user group in close temporal proximity to each other at the first location.

6. The method of claim 1, further comprising:
receiving a second request to authenticate an interaction between a first user and a second user;
determining, by the computing device and based on the list, that the first user is a member of the network and the second user is not one of the members of the network; and
sending, to the first user and based on the determining, an alert.

7. A method of claim 1, further comprising:
receiving, from a mobile device associated with a member of the network, a second request of a content item; and
sending, to one or more of the other members of the network, the content item.

8. A device comprising:
one or more processors; and
memory configured to store computer instructions that, when executed by the one or more processors, cause the device to perform actions comprising:
receiving, from one or more terminals at a first location, a plurality of interactive messages during a predetermined time period, wherein each interactive message comprises personally identifiable information of a user;
determining, based on the plurality of interactive messages, a plurality of users associated with the plurality of interactive messages;
storing a first record that indicates interactive messages were received from the plurality of users in close temporal proximity to each other at the first location;
determining a second record that indicates interactive messages were received from a subset of the plurality of users in close temporal proximity to each other at a second location;
assigning, to each of the first record and the second record, a respective weight;
sending, to at least one user in the subset and based on the weight assigned to the first record being lower than the weight assigned to the second record, a request to confirm users in the subset are members of a network;
receiving a reply to the request, wherein the reply confirms that users in the subset are members of the network;
maintaining a list of members of the network;
adding, based on the reply and to the list, the subset;

receiving a second request to authenticate an interaction between a first user and a second user;
determining, based on the list, that both the first user and the second user are members of the network; and
approving, based on the determining that both the first user and the second user are members of the network, the second request.

9. The device of claim 8, wherein the computer instructions are further configured to cause the device to perform actions comprising:
storing a location list that comprises a plurality of locations, wherein the location list comprises the first location but not the second location, and
wherein the assigning the respective weight is based on the location list.

10. The device of claim 9, wherein the computer instructions are configured to cause the device to determine, based on a number of interactive messages, that were received at each location of the plurality of locations during a second predetermined time period, reaching a threshold, the location list.

11. The device of claim 8, wherein the computer instructions are further configured to cause the device to perform actions comprising:
receiving, from a mobile device associated with a member of the network, a second request of a content item; and
sending, to one or more of the other members of the network, the content item.

12. A non-transitory computer readable medium storing computer instruction that, when executed by one or more processors, cause performance of actions comprising:
receiving, from one or more terminals at a first location, a plurality of interactive messages during a predetermined time period, wherein each interactive message comprises personally identifiable information of a user;
determining, based on the plurality of interactive messages, a plurality of users associated with the plurality of interactive messages;
storing a first record that indicates interactive messages were received from the plurality of users in close temporal proximity to each other at the first location;
determining a second record that indicates interactive messages were received from a subset of the plurality of users in close temporal proximity to each other at a second location;
assigning, to each of the first record and the second record, a respective weight;
sending, to at least one user in the subset and based on the weight assigned to the first record being lower than the weight assigned to the second record, a first message to confirm users in the subset are members of a network;
receiving a reply to the first message, wherein the reply confirms that users in the subset are members of the network;
receiving, from a mobile device associated with a member of the network, a request of a content item;
sending, to one or more of the other members of the network, the content item;
adding, to a membership list, the subset;
receiving a second request to authenticate an interaction between a first user and a second user;
determining, based on the membership list, that both the first user and the second user are members of the network; and
approving, based on the determining that both the first user and the second user are members of the network, the second request.

13. The non-transitory computer readable medium of claim 12, wherein the computer instructions are further configured to cause performance of actions comprising:
storing a location list that comprises a plurality of locations, wherein the location list comprises the first location but not the second location, and
wherein the assigning the respective weight is based on the location list.

14. The non-transitory computer readable medium of claim 13, wherein the computer instructions are configured to determine, based on a number of interactive messages, that were received at each location of the plurality of locations during a second predetermined time period, reaching a threshold, the location list.

15. The device of claim 8, wherein the first record comprises:
a plurality of user groups, wherein each user group comprises two users of the plurality of users; and
an indication, for each of the plurality of user groups, that indicates interactive messages were received from the two users in the user group in close temporal proximity to each other at the first location.

16. The device of claim 8, wherein the computer instructions, when executed by the one or more processors, further configured to cause the device to perform actions comprising:
receiving a second request to authenticate an interaction between a first user and a second user;
determining, by the device and based on the list, that the first user is a member of the network and the second user is not one of the members of the network; and
sending, to the first user and based on the determining, an alert.

17. The non-transitory computer readable medium of claim 12, wherein the first record comprises:
a plurality of user groups, wherein each user group comprises two users of the plurality of users; and
an indication, for each of the plurality of user groups, that indicates interactive messages were received from the two users in the user group in close temporal proximity to each other at the first location.

18. The non-transitory computer readable medium of claim 12, wherein the computer instructions are further configured to cause performance of actions comprising:
receiving a second request to authenticate an interaction between a first user and a second user;
determining, by the device and based on the list, that the first user is a member of the network and the second user is not one of the members of the network; and
sending, to the first user and based on the determining, an alert.

19. The method of claim 1, wherein the sending the request to confirm users in the subset are the members of the network is further based on the first record and the second record each associated with a respective time within a predetermined time range.

20. The device of claim 8, wherein the computer instructions, when executed by the one or more processors, configured to cause the device to send the request to confirm users in the subset are the members of the network by causing the device to send the request further based on the first record and the second record each associated with a respective time within a predetermined time range.

* * * * *